US007278607B2

(12) United States Patent
Fuller

(10) Patent No.: US 7,278,607 B2
(45) Date of Patent: Oct. 9, 2007

(54) SOLAR-POWERED AIRCRAFT

(76) Inventor: Howard J. Fuller, 4047 Harbour Dr., Palmyra, NJ (US) 08065

( * ) Notice: Subject to any disclaimer, the term of this patent is extended or adjusted under 35 U.S.C. 154(b) by 89 days.

(21) Appl. No.: 11/202,722

(22) Filed: Aug. 12, 2005

(65) Prior Publication Data

US 2007/0034741 A1   Feb. 15, 2007

(51) Int. Cl.
*B64B 1/06* (2006.01)
(52) U.S. Cl. ...................................................... 244/30
(58) Field of Classification Search ................ 244/30, 244/31, 24, 96, 97, 61, 94, 98, 99, 29, 36; 55/385.1, 385.3
See application file for complete search history.

(56) References Cited

U.S. PATENT DOCUMENTS 3,897,032 A * 7/1975 Papst ........................... 244/96
6,119,979 A * 9/2000 Lee et al. ...................... 244/97
6,854,688 B2 * 2/2005 McElroy et al. ............ 244/53 R
7,073,749 B2 * 7/2006 Krill et al. ..................... 244/2

* cited by examiner

*Primary Examiner*—Tien Dinh
(74) *Attorney, Agent, or Firm*—William H. Eilberg

(57) ABSTRACT

A solar-powered aircraft uses solar energy to electrolyze on-board water to produce hydrogen. The hydrogen fills various on-board tanks, causing the aircraft to become lighter than air. The hydrogen is also used to operate a fuel cell which provides power for electrical equipment, including a motor for turning a propeller. Water produced as waste by the fuel cell is recycled for use in the production of hydrogen. When hydrogen is removed from the tanks, either because it is consumed by the fuel cell or because it is compressed and pumped out of the tanks, air returns to the tanks, and the aircraft becomes heavier than air. The aircraft can thus be made to climb and descend by making it lighter than air, or heavier than air. The aircraft emits no harmful substances into the environment. The aircraft can remain aloft indefinitely, limited only by an insignificant amount of leakage of hydrogen and water.

9 Claims, 4 Drawing Sheets

SOLAR-POWERED AIRCRAFT

BACKGROUND OF THE INVENTION

The present invention relates to the field of aviation, and provides a solar-powered aircraft which is lighter than air at certain times, and heavier than air at other times.

A conventional, heavier-than-air aircraft requires a source of energy to stay aloft. The amount of time an aircraft can remain aloft is limited by the amount of fuel on-board.

A lighter-than-air aircraft carries a gaseous lifting medium, such as hydrogen or helium, to maintain buoyancy, as well as some fuel to power a propeller or other means for directing the aircraft along a desired flight path. The gaseous medium is eventually consumed, as it becomes necessary to vent the gas in order to descend. Moreover, the supply of fuel is also limited. Thus, a lighter-than-air aircraft still cannot remain aloft indefinitely.

The present invention provides a solar-powered aircraft which, in theory, can remain aloft indefinitely, subject only to small amounts of leakage as described below.

One important use for the aircraft of the present invention is as an unmanned aerial vehicle (UAV), which is employed for long-duration aerial surveillance. The aircraft of the present invention is preferably constructed with a configuration that has inherently small radar and infrared signatures. Thus, the aircraft of the present invention can remain aloft for indefinite periods, while conducting surveillance in various contexts.

The aircraft of the present invention is not limited to a particular configuration or field of use. The invention can be used to make virtually any kind of aircraft.

SUMMARY OF THE INVENTION

The solar-powered aircraft of the present invention includes a body, which may have the form of a flying wing or a deltoid configuration, or a conventional combination of fuselage and wings, or any other form. Solar cells are located on the outside of the body, preferably on the upper surfaces of the fuselage and/or wings. The solar cells provide electrical power to an electrolyzing unit which separates water, taken from an on-board tank, into hydrogen and oxygen. The oxygen is vented to the outside.

The hydrogen produced by electrolysis is directed into one or more low-pressure hydrogen storage tanks. The low-pressure tanks are preferably defined by vented chambers formed by spars in the wing portion of the aircraft body. Hydrogen enters flexible bags, located in these chambers, and as the bags become filled with hydrogen, they expand and drive out the air formerly occupying the chambers. The result is that air in the chambers is replaced with hydrogen, and the aircraft becomes lighter than air. As the production of hydrogen continues beyond what is needed for filling the bags, some of the hydrogen can be compressed and stored in high-pressure tanks, for later use.

In addition to providing buoyancy, the hydrogen produced by electrolysis is also used as an input to an on-board fuel cell, which takes oxygen from the surrounding air. The fuel cell generates electric power which is used to operate various motors, pumps, compressors, and avionics on the aircraft. One such motor may drive a propeller for directing the flight path of the aircraft. The waste product of the fuel cell is water vapor, which is condensed and returned to a water storage tank, to be separated again by the electrolyzing unit.

The in-flight attitude of the aircraft can be adjusted by pumping water into various auxiliary tanks, so as to shift the weight of the water. In this way, the aircraft can be made to pitch or roll.

The aircraft is thus made to climb by filling the low-pressure tanks with hydrogen, making the aircraft lighter than air, and by adjusting the distribution of water so as to pitch the aircraft nose up. The aircraft is made to descend by removing hydrogen from the low-pressure tanks, either by pumping the hydrogen into the high-pressure tanks, or by using the hydrogen to drive the fuel cell, or both, so that the aircraft becomes heavier than air. The distribution of water is again adjusted so as to pitch the aircraft nose down.

The aircraft of the present invention does not emit harmful substances into the atmosphere. Moreover, the aircraft operates with a closed-loop system, in which water is used to generate hydrogen, which powers a fuel cell, and wherein the water produced by the fuel cell is recycled to generate hydrogen. The excess hydrogen produced during daylight hours is stored, and used to provide buoyancy and/or to drive the fuel cell at night. The aircraft can therefore remain aloft indefinitely, limited only by possible leakage of hydrogen and/or water.

The present invention therefore has the primary object of providing a solar-powered aircraft.

The invention has the further object of providing a solar-powered aircraft which is, at some times, lighter than air, and at other times heavier than air.

The invention has the further object of providing a solar-powered aircraft which does not consume significant amounts of fuel, and which does not emit harmful substances into the environment.

The invention has the further object of providing a solar-powered aircraft which can remain aloft indefinitely, limited only by leakage of substances used to operate the aircraft.

The invention has the further object of providing a solar-powered aircraft which can be conveniently used as an unmanned aerial vehicle for performing aerial surveillance.

The reader skilled in the art will recognize other objects and advantages of the present invention, from a reading of the following brief description of the drawings, the detailed description of the invention, and the appended claims.

DETAILED DESCRIPTION OF THE INVENTION

The present invention is a solar-powered aircraft which is heavier than air at certain times, and which is lighter than air at other times. The operation of the aircraft comprises a closed-loop cycle as explained below.

Solar electric cells on the upper surfaces of the wings and/or fuselage provide electric power to separate on-board water, by electrolysis, into hydrogen and oxygen. The oxygen is largely discarded overboard, while the hydrogen is stored in the aircraft, either in low-pressure tanks formed between wing spars, or in auxiliary high-pressure tanks, or both. The pressurization of the wing spars with hydrogen contributes to structural integrity of the aircraft, as well as providing a means for storage of hydrogen.

The hydrogen serves as a lifting medium for the aircraft, allowing the aircraft to ascend as a lighter-than-air vehicle.

Some of the stored hydrogen is combined with oxygen (taken from the surrounding environment) in a fuel cell, to produce electricity for propulsion by one or more electric motors, and to power the electrical and avionic systems of the aircraft. The waste product of the fuel cell is water vapor, which is condensed and recycled to the water storage tanks for subsequent separation by electrolysis. Some of the water can be distributed among various tanks, located at different positions on the aircraft, to change the weight distribution of the aircraft, so as to achieve the desired lateral and/or longitudinal attitude control.

Figure 1:
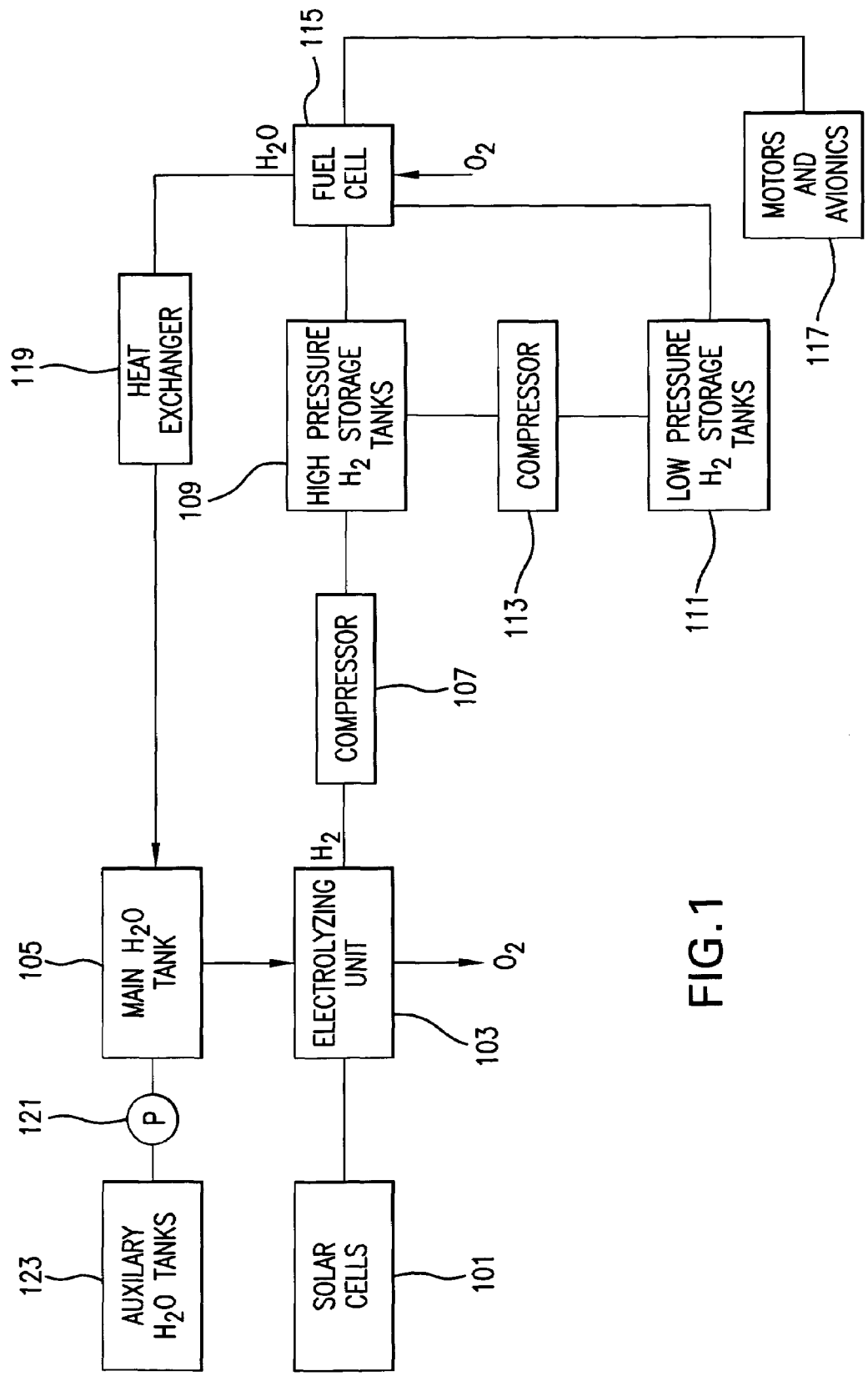
FIG. 1 provides a block diagram showing the essential non-aerodynamic components of the aircraft of the present invention.

FIG. 1 provides a block diagram showing the major non-aerodynamic components of the aircraft of the present invention. These components are preferably controlled by an on-board computer or microprocessor, or its equivalent. The basic programming of the microprocessor is illustrated by the flow chart of FIG. 2.

As shown in FIG. 1, solar cells 101 are provided on the aircraft, and are preferably located on the upper surfaces of the wings and/or fuselage, so as to collect a maximum amount of sunlight. The solar cells could be provided on other surfaces as well, but it is preferred that they not be installed on the canopy or on the control surfaces. Electric power from the solar cells drives electrolyzing unit 103, which receives water from main water tank 105. The electrolyzing unit separates water into hydrogen and oxygen. Oxygen generated by the electrolyzing unit is largely vented overboard, as shown, and hydrogen produced by that unit passes to compressor 107.

The compressor 107 enables the hydrogen produced by electrolysis to be stored at high pressure, preferably of the order of at least eight atmospheres, in high-pressure tanks 109. Hydrogen from the high-pressure tanks can be conveyed to low-pressure hydrogen storage tanks 111.

Compressor 113 enables low-pressure hydrogen to be recompressed and directed back into the high-pressure tanks 109.

Hydrogen from any or all of the hydrogen storage tanks is directed into fuel cell 115, along with oxygen from the outside environment. The fuel cell produces electrical power which is used to operate the various motors, compressors, pumps, and avionic systems (collectively represented by block 117) of the aircraft. The waste product of the fuel cell is water vapor, which is condensed in heat exchanger 119, with the resulting condensate being conveyed to the main water tank 105. Water from the main water tank may be pumped, by pump 121, into various auxiliary water tanks, for purposes of adjusting the weight in each auxiliary tank, thereby controlling the attitude of the aircraft. In a preferred embodiment, there are four such auxiliary water tanks, two at or near the wingtips, and two at or near the nose and tail of the aircraft. In the event of freezing temperatures at higher altitudes, the water can be mixed with alcohol to prevent freezing.

The water in the main tank is therefore replenished by the waste product of the fuel cell, and is ready to be separated into oxygen and hydrogen, using the power produced by the solar cells. The aircraft therefore operates in a closed-loop cycle, the water being used to make hydrogen, and the water vapor from the fuel cell being condensed and recycled to the main water tank for re-use.

Figure 2:
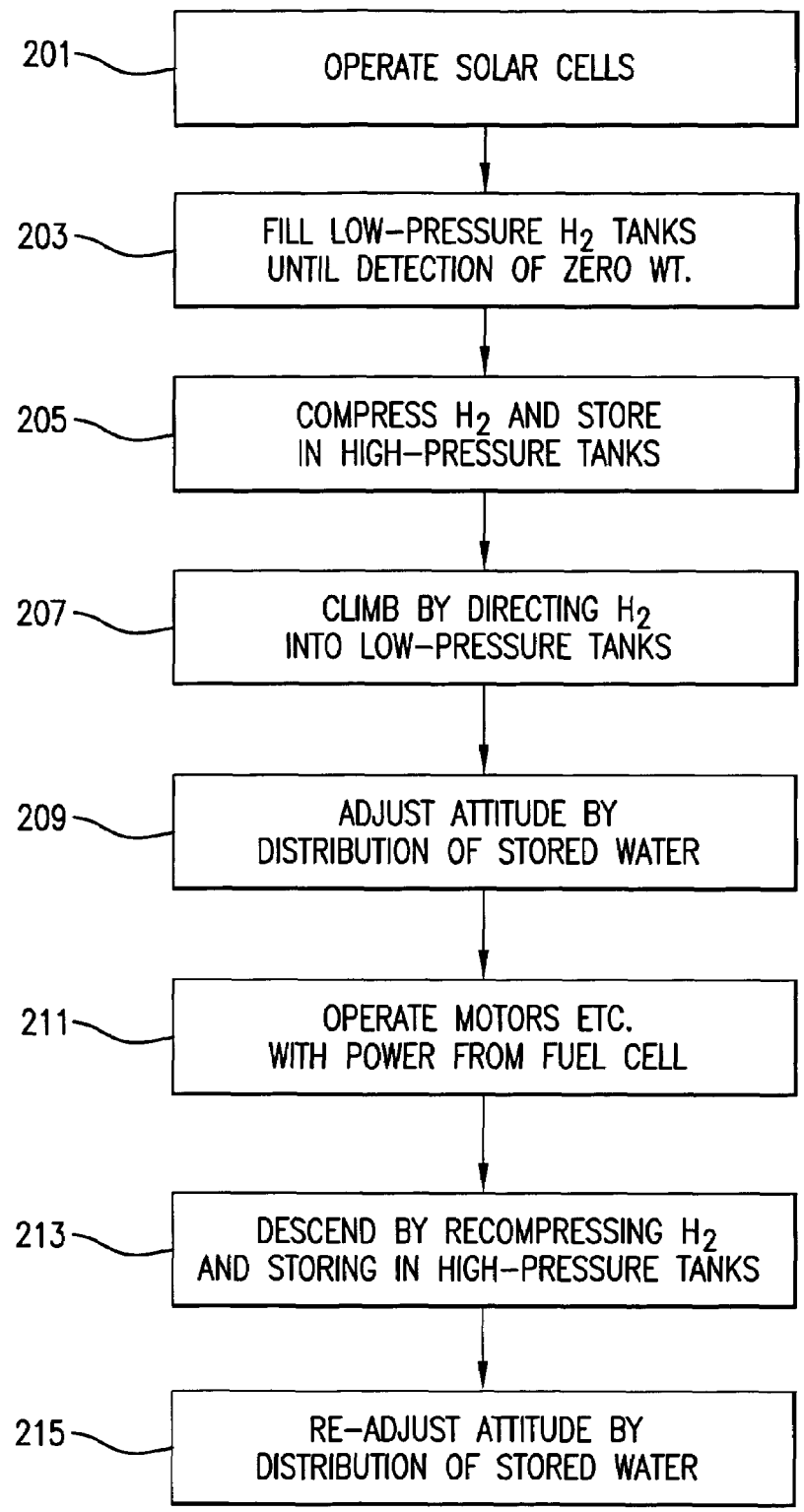
FIG. 2 provides a flow chart, showing the essential programming steps of the on-board computer which controls the aircraft of the present invention.

FIG. 2 illustrates the basic steps in the operation of the aircraft of the present invention. FIG. 2 thus represents the program operated by an on-board computer, or equivalent, used to control the flight of the present aircraft.

The process begins with the aircraft at rest, on the ground, under direct sunlight, and with the hydrogen storage tanks empty. A master switch is engaged, powering the aircraft electrical system, including the control computer, using a independent 28-volt battery on a temporary basis. The computer selects the condition of "neutral buoyancy". As shown in block 201, the solar cells begin to generate power.

Electric power from the solar cells operates the electrolyzing unit, which separates water from the main water storage tank into hydrogen and oxygen. The hydrogen generated in this manner is conveyed to the low-pressure hydrogen storage tanks, which preferably include gas bags located in the main spar cavities, to be described later. The filling of the low-pressure hydrogen tanks is represented by block 203. The oxygen generated by electrolysis is discarded overboard. The net result is a steady loss of total mass for the aircraft, as air in the low-pressure storage tanks is vented to the outside and effectively replaced by hydrogen.

As the hydrogen tanks fill, the aircraft gradually approaches the point of becoming lighter than air. When the landing gear load sensors detect zero weight on the gear, the computer may continue to direct the production of hydrogen, while redirecting the hydrogen, through suitable valves and conduits, into a hydrogen compressor which compresses the hydrogen and stores it in high-pressure storage tanks, as indicated in block 205. Preferably, the hydrogen in the high-pressure tanks is stored at a pressure of at least eight atmospheres. The compression and transfer of the hydrogen results in no net loss or gain of net mass.

The computer may then direct the aircraft to climb. Upon issuance of a direction to climb, high-pressure hydrogen from the high-pressure storage tanks is directed into the low-pressure hydrogen storage tanks, as indicated in block 207. The hydrogen enters gas bags in the low-pressure tanks, preferably located in the spars of the wings. The spars define chambers or cavities within which the bags are located. The expanding gas bags displace any remaining air in this area, and force it overboard through vents in the spars. The aircraft therefore becomes lighter than air, and rises.

As the aircraft rises, the attitude of the aircraft can be adjusted by pumping water from the main water tank into various auxiliary water tanks located at various places in the aircraft, as indicated in block 209. In one preferred embodiment, the auxiliary water tanks are located at or near the wingtips. Those tanks being aft of the center of gravity of the aircraft, the transfer of weight causes the nose of the aircraft to rise relative to the trailing edge or tail. Inasmuch as the aircraft is also shaped as an airfoil, this change of attitude causes the entire aircraft to move forward at a rate proportional to, and far greater than, its upward velocity.

Upon reaching the desired cruising altitude, the electric propulsion motors may be employed, as indicated in block 211, to provide forward velocity at a constant altitude, or may be used to maintain a stationary position in the face of a headwind. Electrical power for the motors is derived from an appropriately sized fuel cell, which combines hydrogen from the aircraft storage tanks and oxygen from the atmosphere to produce electrical current. The fuel cell produces some heat, which can be used to maintain the temperature of the water in the main water tank, as well as water vapor, which can then be condensed and returned to the main water tank.

When the electric motors are not being used for forward propulsion, hydrogen in the main, low-pressure storage tanks can be recompressed and stored in the high-pressure auxiliary tanks, as represented in block 213.

The result of this recompression is a steady gain in the mass of the aircraft, as air re-enters the main spar area around the hydrogen gas bags, which are now being depleted and are thus shrinking in size. Thus, the aircraft descends.

As the aircraft gains mass, and begins to sink through the atmosphere, water in the wingtip tanks (or other auxiliary water storage tanks) is pumped back into the main water storage tank, as indicated in block 215, thus moving the center of gravity forward, and resulting in a nose-down pitching moment. Again, since the aircraft comprises an airfoil, any sink rate will be accompanied by a proportionally large horizontal velocity.

In summary, the aircraft can "porpoise" through the atmosphere, using the force of gravity to aid in propulsion.

When it is desired to land, the low-pressure hydrogen is further depleted, and preferably recompressed and stored in the high-pressure tanks. As the aircraft nears the landing site, neutral buoyancy is again selected and the aircraft can be gradually landed from a hover. Alternatively, a slightly positive weight condition may be selected, and the aircraft can be landed like any other glider.

At all times, lateral control and trim is provided by transferring water from one wingtip tank (or other auxiliary water storage tank) to another, and/or between a nose tank and a tail tank, thus providing a weight shift to bank or pitch the aircraft one way or the other, or to maintain a level attitude.

Alternatively, attitude control could be effected in a conventional manner, by manually or automatically operating various control surfaces of the aircraft.

Figure 3:
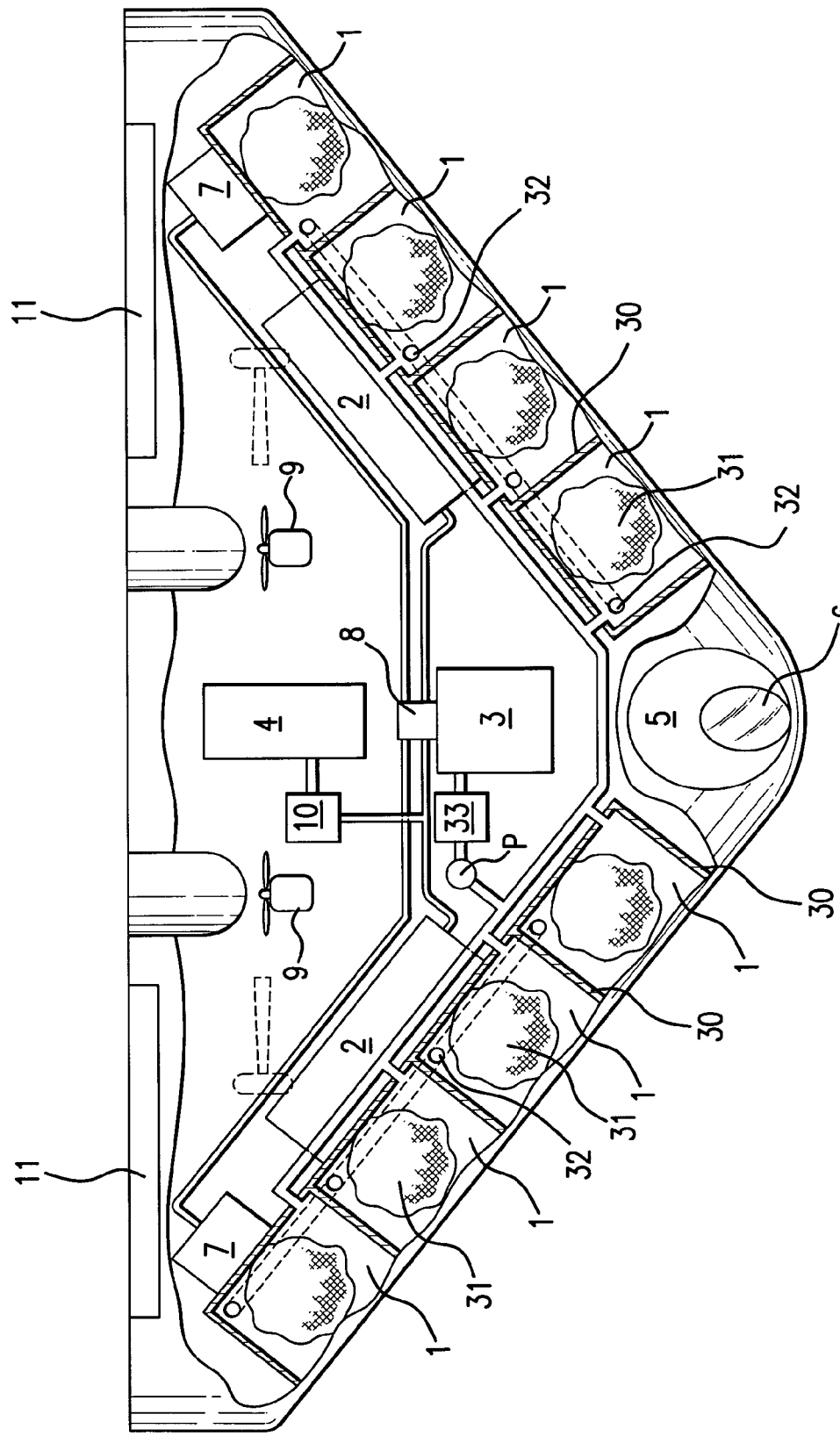
FIG. 3 provides a plan view, partly in cross-section, showing an aircraft made according to the present invention, the aircraft having a deltoid configuration.
Figure 4:
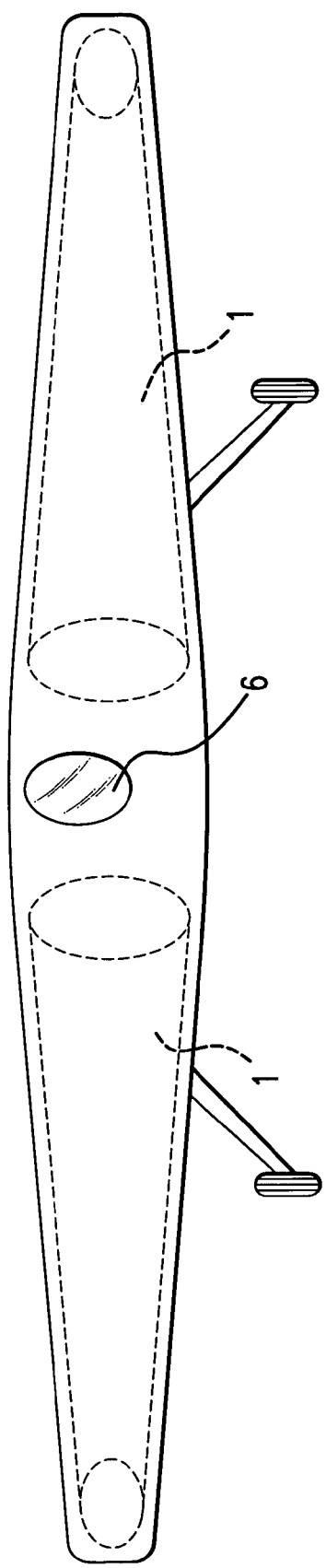
FIG. 4 provides a front view of the aircraft of FIG. 3.

The amount of hydrogen stored on the aircraft may be maximized by forming the body of the aircraft in a "flying wing" or a deltoid configuration. FIGS. 3 and 4 provide an example of an aircraft of the present invention, having a deltoid shape.

As shown in FIG. 3, the aircraft includes a plurality of low-pressure hydrogen storage tanks 1, defined by spars 30. High-pressure hydrogen storage tanks 2 are located adjacent to, and aft of, the low-pressure tanks. The low-pressure tanks include hydrogen gas bags 31. Each such tank includes vents 32.

Electrolyzing unit 33, powered by electricity generated by solar cells (not shown in FIG. 3 but indicated in FIG. 1), electrolyzes water from main water tank 3, to generate hydrogen that is pumped, through pump P into the low-pressure or high-pressure tanks. Oxygen generated by the electrolysis is largely discarded overboard.

Fuel cell 4, which may receive hydrogen through compressor 10, generates electricity to power various systems, such as electric propulsion motors 9, as well as the pumps, compressors, and aircraft avionics.

Water transfer pump 8 transfers water among the main water storage tank 3 and the auxiliary water tanks 7, for controlling the distribution of aircraft weight, and therefore controlling the attitude of the aircraft. For clarity of illustration, only two auxiliary water tanks are shown in FIG. 3, but other such tanks can be provided, as explained above.

The aircraft includes a control cabin 5 and canopy 6. Also shown are control surfaces 11. The control surfaces are shown as elevons, but for other aircraft configurations, there may be a conventional combination of elevator, rudder, and ailerons.

The primary means of propulsion for the aircraft of the present invention is the active control of the aircraft weight. The weight of the aircraft is reduced by generating hydrogen in a solar-powered electrolysis unit, and by using that hydrogen to displace air from the spar areas. Thus, air in the spar areas is replaced by hydrogen, which is lighter than air. The weight of the aircraft is increased by removing the hydrogen from the spar tanks, thereby allowing atmospheric air to return to the spar areas. By replacing hydrogen with ordinary air in the spar areas, the weight of the aircraft is increased. Hydrogen is removed from the main spar tanks either by compressing it and conveying it to high-pressure storage tanks, or by using the hydrogen to power a fuel cell, or some combination of both of the above steps.

The sequence of filling of the low-pressure hydrogen storage tanks and the high-pressure hydrogen storage tanks can be varied. What is important is that when hydrogen is conveyed into the gas bags in the spar areas, air in the spar areas is forced out, thereby reducing the overall density of the aircraft, until the aircraft becomes lighter than air. When hydrogen is conveyed into the high-pressure tanks, it is for the purpose of storing more hydrogen on-board.

During daylight hours, the electrolysis process can be conducted during all phases of flight. While the aircraft is gliding downward, the hydrogen being produced can be compressed and stored in the high-pressure tanks, for later release into the main spar storage tanks for subsequent climbing.

The secondary means of propulsion of the aircraft is the electric motor or motors, which turn external propellers or internal ducted fans. These units can provide control about the vertical axis of the aircraft while it is in forward motion, while it is hovering, or while it is maintaining a fixed position while flying into a headwind. The motors can also provide desired acceleration, and/or maintenance of forward speed, while the aircraft is transitioning from lighter-than-air to heavier-than-air and back. At these transition points, without active propulsion, the aircraft velocity would otherwise fall to zero.

It is apparent from the above description that the aircraft of the present invention can be controlled as desired to achieve a desired flight path. The on-board computer is preferably connected to conventional aircraft instruments, such as an altimeter, an airspeed indicator, an attitude indicator etc., so as to receive continuous input concerning the parameters of flight. The computer can therefore respond to these sensed parameters by generating the necessary commands to insure that the aircraft performs as desired. Alternatively, or in addition to the conventional instruments noted above, the aircraft could be provided with a GPS receiver, the output of which is operatively connected to the computer, which could then deduce information about altitude and speed. The computer could then make the necessary commands to keep the aircraft on the desired flight path.

Although the invention has been illustrated with respect to a deltoid configuration, the invention is not limited to this particular shape. The deltoid configuration has the advantage that it maximizes the volume available for gas storage, and maximizes the surface area for positioning of the solar cells. However, the body of the aircraft could be formed with other configurations instead.

From the above description, it is apparent that the aircraft can be operated for extended periods of time, since the only substantial byproduct of the production of electrical power is water vapor, which is then condensed and recycled for subsequent separation by electrolysis. No harmful emissions are produced, and no fuel is depleted. The major limitation to the duration of flight is leakage of hydrogen and/or water. With proper sealing of tanks and conduits, the amount of leakage can be held to an insignificant level.

It is preferred that the aircraft be operated so as to continue to generate hydrogen during daylight hours, even if the hydrogen is not immediately needed. The excess hydrogen can then be stored in the high-pressure tanks, and can be used at night, when solar power is not available, to power the fuel cell, and/or to maintain buoyancy by occupying the gas bags in the main spar tanks.

The aircraft is preferably constructed mainly of lightweight composite materials. The deltoid shape, described above, has an inherently low radar signature. Thus, an aircraft having a deltoid shape, constructed according to the present invention, is especially useful for long-duration surveillance as an unmanned aerial vehicle (UAV). The aircraft also exhibits relatively little infrared signature.

The computer represented by the programming shown in FIG. 2 may be the sole control mechanism if the aircraft is a UAV. Alternatively, if the aircraft is manned, the computer may still be used as a buffer between the human operator and the systems of the aircraft described above. Thus, a human operator could manually operate switches which generate signals to the computer, and the computer would generate appropriate commands to the various systems as described above.

The invention can be further modified. The aircraft need not have a deltoid configuration, but could take the form of many other conventional aircraft. The number and configuration of tanks in the aircraft, including hydrogen storage tanks and water storage tanks, can be varied. The steps in the operation of the aircraft are preferably coordinated by the programmed computer described above, but other equivalent control devices can be substituted for the computer. These and other modifications, which will be apparent to those skilled in the art, should be considered within the spirit and scope of the following claims.

What is claimed is:

1. A solar-powered aircraft, comprising:
   a) a solar cell disposed on an exterior surface of an aircraft,
   b) at least one water storage tank, disposed within a body of the aircraft,
   c) an electrolyzing unit, wherein the electrolyzing unit is connected to electrolyze water from the water storage tank, and wherein the electrolyzing unit receives electrical power from the solar cell,
   d) at least one hydrogen storage tank, the hydrogen storage tank being connected to receive hydrogen produced by the electrolyzing unit,
   e) a fuel cell, the fuel cell being connected to receive hydrogen from the hydrogen storage tank so as to produce electric power, and
   f) an electric motor, the motor being connected to receive electric power from the fuel cell, the motor being connected to a propeller for driving the aircraft,
   wherein the hydrogen storage tank comprises a gas bag located in a vented chamber, wherein filling of the bag with hydrogen causes the bag to expand and displace air from the chamber through a vent.

2. The aircraft of claim 1, wherein there is at least one main water storage tank and at least one auxiliary water storage tank, and wherein the aircraft further comprises means for distributing water among the main and auxiliary water storage tanks so as to control an attitude of the aircraft.

3. The aircraft of claim 1, further comprising means for condensing water vapor produced by the fuel cell and for recycling condensed water to the water storage tank.

4. A solar-powered aircraft, comprising:
   a) a solar cell disposed on an exterior surface of an aircraft,
   b) at least one water storage tank, disposed within a body of the aircraft,
   c) an electrolyzing unit, wherein the electrolyzing unit is connected to electrolyze water from the water storage tank, and wherein the electrolyzing unit receives electrical power from the solar cell,
   d) at least one hydrogen storage tank, the hydrogen storage tank being connected to receive hydrogen produced by the electrolyzing unit,
   e) a fuel cell, the fuel cell being connected to receive hydrogen from the hydrogen storage tank so as to produce electric power, and
   f) an electric motor, the motor being connected to receive electric power from the fuel cell, the motor being connected to a propeller for driving the aircraft,
   wherein there is at least one high-pressure hydrogen storage tank, and at least one low-pressure hydrogen storage tank, and wherein the low-pressure hydrogen storage tank comprises a gas bag located in a vented chamber, wherein filling of the bag with hydrogen causes the bag to expand and displace air from the chamber through a vent.

5. A solar-powered aircraft comprising:
   a) an aircraft body having an outside and an interior,
   b) at least one solar cell located on the outside of the aircraft body,
   c) a water storage tank and an electrolyzing unit, located in the interior of the aircraft body, the electrolyzing unit being connected to receive electrical power from the solar cell, the electrolyzing unit being in fluid communication with the water storage tank so as to separate water into hydrogen and oxygen, and
   d) a hydrogen storage means, located in the interior of the aircraft body, the hydrogen storage means being connected to the electrolyzing unit such that hydrogen produced by the electrolyzing unit enters the hydrogen storage means so as to increase buoyancy of the aircraft,
   wherein there are at least two interconnected hydrogen storage means, wherein a first hydrogen storage means comprises a low-pressure gas bag disposed in a chamber within the interior of the aircraft body, and wherein a second hydrogen storage means comprises a high-pressure storage tank.

6. The aircraft of claim 5, further comprising a fuel cell, the fuel cell being connected to receive hydrogen from the hydrogen storage means.

7. The aircraft of claim 6, further comprising an electric motor connected to a propeller, the motor being connected to derive electrical power from the fuel cell.

8. The aircraft of claim 5, wherein there are at least two water storage tanks, and wherein the aircraft includes means for distributing water among the water storage tanks so as to control an attitude of the aircraft.

9. The aircraft of claim 5, further comprising a programmed computer, the computer comprising means for controlling production and storage of hydrogen so as to cause the aircraft to become selectively lighter than air and heavier than air.

* * * * *